July 21, 1953    E. E. WITTNER ET AL    2,646,059
AUTOMATIC DRAIN VALVE FOR PORTABLE IRRIGATION PIPES
Filed Aug. 28, 1950    2 Sheets-Sheet 1
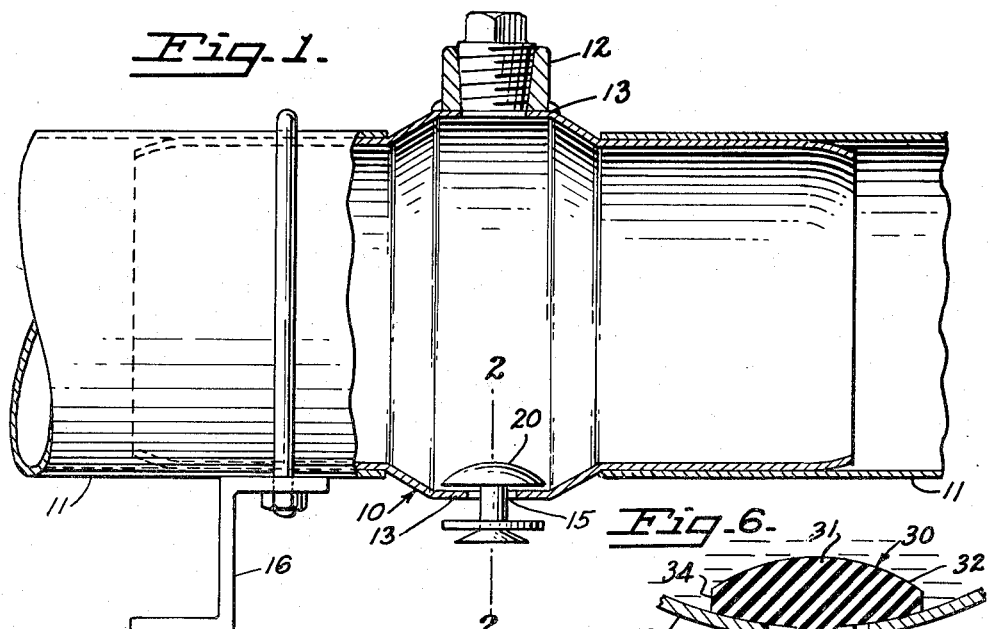
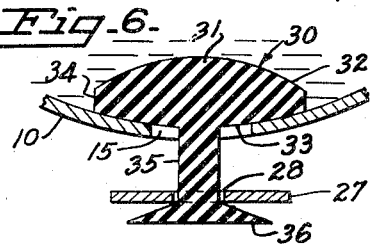
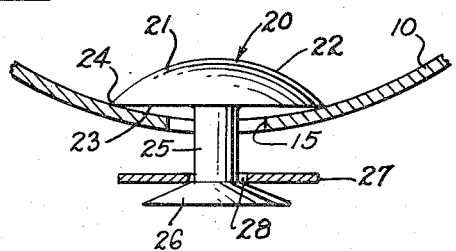
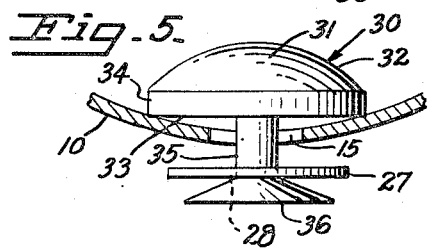
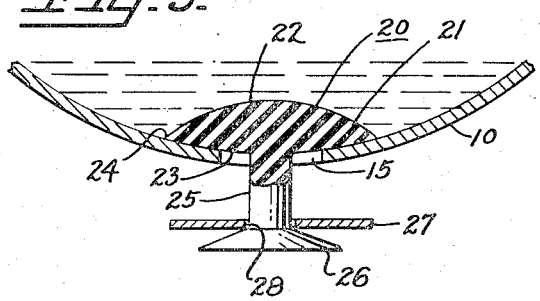
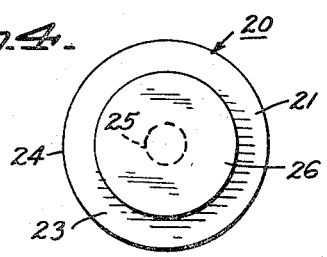
INVENTORS
EDWARD E. WITTNER
ROGER M. SHERMAN
BY
ATTORNEY

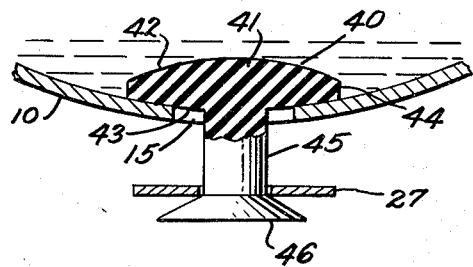
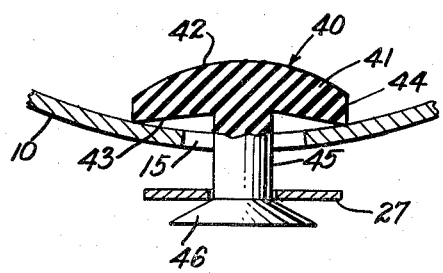
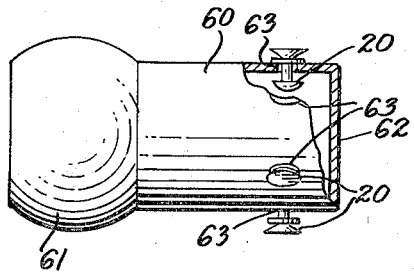
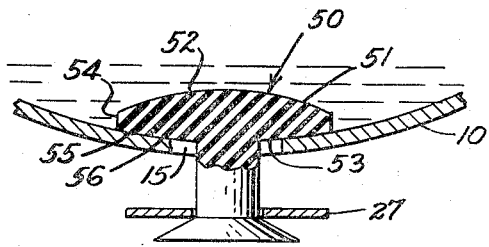
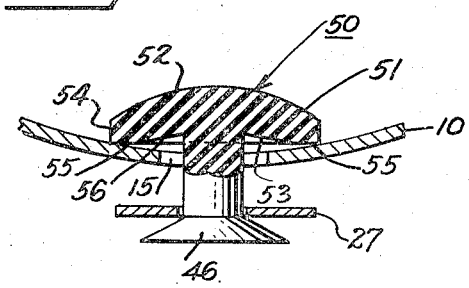
INVENTORS
EDWARD E. WITTNER
ROGER M. SHERMAN
BY
ATTORNEY Patented July 21, 1953

2,646,059

UNITED STATES PATENT OFFICE 2,646,059

AUTOMATIC DRAIN VALVE FOR PORTABLE IRRIGATION PIPES

Edward E. Wittner, San Francisco, and Roger M. Sherman, Palo Alto, Calif., assignors to W. R. Ames Company, San Francisco, Calif., a corporation of California Application August 28, 1950, Serial No. 181,744

12 Claims. (Cl. 137—107)

This invention relates to an automatic drain device for draining water through the wall of a pipe.

The introduction of portable irrigation pipe has enabled farmers to make extensive use of a comparatively small number of units of pipe by moving the same string of pipe from place to place. This progress has been made possible by the use of light-weight pipes, and the problem which has perhaps caused the most trouble has been that of draining the standing water out of the pipe after each use.

The water left in the pipes after the flow has ceased, weighs so much that the pipes cannot be carried or dragged across the ground, until they have been drained. The weight of the water also prevents the uncoupling of the most convenient kinds of irrigation pipe couplers, because they cannot be easily manipulated when the pipe is filled or partially filled with water. The problem has been especially acute where the pipe is laid along uneven ground, because the pipes that lie lower than the end pipes remain completely filled with water even after the end pipes have been drained.

Where there is no drain in each pipe section, the water can be drained only by disconnecting each section from every other section and then raising one end higher than the other and holding it there until it has been drained. This is quite difficult with the most popular couplings, because it is very difficult to uncouple the pipe until it has been drained.

The problem has not been solved by providing manually operated drains, because with them someone must first travel the full length of the course of pipe, opening all the drains, and must either wait at each section until all its water has drained out and then close the drain before going to the next pipe, or someone must travel along the whole course twice, first opening all the drains, and then going back and closing the drains before water can again be sent through the pipes. This is too much trouble and takes too much time and labor.

Some pipe manufacturers have sought to solve the problem by providing loose gaskets at each coupling, which tighten up under pressure and then leak when the pressure has been turned off. This is not a satisfactory solution, because portable irrigation pipe is preferably made in long sections that will sag in the middle, so that the pipe cannot be completely drained from end leakage unless the pipes already lie on a slope.

Some attempts have been made to provide automatic drains in the center of the pipe sections as in the present invention, but they have heretofore been unsatisfactory, because the constructions have been expensive and complicated, and, in all instances of which we are aware, the drain closure means has not been readily replaceable. When it wore out or became broken, the whole pipe section had to be replaced or sent back to the factory for repairs. There has been no simple valving device that could be replaced or repaired in the field. This has caused costly delays and shutdowns which could be avoided only by the farmer keeping many extra sections on hand. Even so, each replacement of this type of drain has been difficult and has required extra work.

The present invention solves the problems of draining irrigation pipe. It provides an automatic drain that closes under liquid pressure and remains closed so long as there is substantial water pressure in the pipe. When the water pressure decreases, the pipe is automatically drained. The automatic drain is a combination that includes an opening through the wall of the pipe and a unitary valve closure member which may be easily replaced should replacement be necessary. The valve closure member comprises a resilient member that is preferably shaped somewhat like a mushroom, with a cap, a stem, and a flange at the bottom of the stem. The cap rests inside the pipe adjacent the opening, and the valve stem extends out through the opening. The flange, which is larger in size than the pipe opening, prevents the velocity of the liquid through the pipe from pulling the entire valve in through the opening and carrying it away. When the pressure is low, the bottom surface of the cap is in contact with the round pipe walls at only two points. However, when the liquid pressure increases, the cap is forced radially outwardly, and its bottom surface is forced into contact with the pipe walls all around the opening, so that the opening is sealed off. When the pressure is relieved (as when the water is turned off), the cap raises off the pipe wall, unseals the opening, and the pipe drains.

Other features of the invention will be apparent from the following description of several embodiments thereof. Preferred forms of the invention are illustrated, but the invention is not to be limited to specific details shown and described, except as stated in the appended claims.

In the drawings:

Fig. 1 is a view in elevation and partly in section of the center portion of one section of portable irrigation pipe. A short fitting is press-fit between two long sections that are cut off in the drawing in order to save space. The short section has a riser outlet and an automatic drain embodying the pinciples of this invention, which is shown in its open or draining position.

Fig. 2 is an enlarged view in section taken along the line 2—2 of Fig. 1 showing the automatic drain with its closure valve in its open or draining position.

Fig. 3 is a view similar to Fig. 2 showing the valve in its closed or sealing position.

Fig. 4 is a bottom plan view of the valve closure member only, as shown in the assembly of Figs. 1 to 3.

Fig. 5 is a view similar to Fig. 2 showing a somewhat modified form of valve closure member in its open position.

Fig. 6 is a view similar to Fig. 3 showing the valve closure member of Fig. 5 in its closed position.

Fig. 7 is a view similar to Figs. 2 and 5 of another modified form of valve closure member in its open position.

Fig. 8 is a view similar to Figs. 3 and 6 showing the valve of Fig. 7 in its closed position.

Fig. 9 is a view similar to Figs. 2, 5, and 7 of still another modified form of valve in its open position.

Fig. 10 is a view similar to Figs. 3, 6, and 8 showing the valve of Fig. 9 in its closed position, and Fig. 11 is a view in side elevation of a plug member that is coupled on the end of a string of pipe to close the end, the plug member having several valve closure members of the type shown in Figs. 1 to 4, with a portion of the member adjacent the plugged end broken away and shown in section.

The portable irrigation pipe shown in Fig. 1 is often made in 40-foot sections, each of which has a short center sleeve 10 permanently press-fit between two twenty-foot sections 11. The sleeve 10 may have a riser outlet 12 where a sprinkler may be attached, otherwise it is plugged as shown. The outlet 12 is preferably located on an annular flared portion 13 that is of larger diameter than the walls of the pipe and that also serves as a stop to limit the movement of the ends of the pipe sections 11 when the press-fitting is done. The drain opening 15 preferably is located on this flared portion 13 diametrically opposie the outlet 12. However, this is not necessary, and the drain opening 15 may be located elsewhere along the pipe. In fact, the drain opening 15 may be placed anywhere on any pipe, depending on the use to which it is to be put. (See Fig. 11, for example.)

The opening 15 is preferably round and is preferably so located that it will lie along the bottom of the pipe when the riser 12 is in its proper position. For this reason, the sleeve 10 is preferably supported slightly above the ground by a bracket 16 strapped to the pipe, which prevents the closure valve 20 from coming in contact with the ground and thereby interfering with its closing.

The valve closure member 20 preferably is shaped in general like a mushroom and is preferably made from soft rubber or some synthetic material which responds similarly. For normal pressure it preferably has a hardness between 40 and 60 durometers. Where the water pressure is to be high, harder rubber may be used. Conversely, where the water pressure is low, softer rubber should be used. However, the responsiveness of the valve member 20 is usually adjusted by varying its proportions and its shape, as explained later, rather than by varying the hardness of the rubber, because in that way adaptability to much wider pressure variation can be obtained.

The valve member 20 shown in Figs. 1 to 4 includes a round cap 21 with an upper spherically arcuate surface 22 and a flat bottom surface 23 which intersect each other at its outer rim 24. When the pressure is low, the rim 24 and bottom surface 23 of the cap 21 will touch the walls of the pipe sleeve 10 at only two points, as shown in Fig. 2. When the fluid pressure increases, the cap 21 will be forced down until an outer annular area of its lower surface 23 touches the pipe sleeve wall all around the opening 15, and the opening is completely sealed off. Further pressure will increase the width of this annular area of contact and the firmness of contact.

An integral stem 25 depends from the center of the cap 21 and has a circular enlarged base flange 26, which is larger in diameter than the pipe opening 15. The stem extends through the opening 15 and the base 26 is made large enough to prevent the velocity of the water passing through the pipe from pulling the base 26 through the opening 15 into the pipe.

If the water velocity being used is too swift for the flange 26 to hold, a washer 27 may be added ahead of the flange 26. The outside diameter of the washer 27 should be larger than the diameter of the opening 15, and its opening 28 should be smaller than the diameter of the opening 15. This makes it less likely that the rushing water can pull the flange 26 through the washer opening 28 than that it can pull the flange 26 through the larger opening 15 when there is no washer. The washer is usually put on the flange 26 after the valve member is in the opening 15, unless the valve member is inserted from the outside cap first in which case it can be in place on the stem 25.

In operation, when the pipe is empty and up to the time that sufficient fluid pressure to close the valve member 20 is built up in the pipe, the lower planar surface 23 of the valve cap 21 will touch the walls of the pipe sleeve 10 only at two points and a very small area adjacent them. Some of the first water that comes into the pipe will leak out under the cap 21. When liquid fills the pipe and its static pressure becomes sufficient, the rubber cap 21 will be pressed against the pipe wall 10 so that the outer annular portion of the surface 23 of the cap 21 seals against the sleeve inner wall bordering the opening 15. In this position, no liquid can leak out. When the static pressure of the fluid drops, either because the main valve is closed, or the head of water left in the pipe is lowered, or for any other reason, then the resiliency of the valve member 20 causes it to resume its normal two point contact position. This allows the water to pass through the opening 15.

The fact that the valve member 20 is made of flexible material such as rubber makes its installation and removal easy. In the construction shown in Fig. 1, this installation may be done in either of two ways. The cap 21 may be forced into the sleeve through the opening 15 so that the cap 21 is inside the sleeve and the flange 26 is outside the sleeve. Another way is to insert the valve member 20 into the sleeve through the opening 12 and then to push the flange 26 out through the opening 15. The washer 27, if used, may then be installed by forcing the base 26 through the washer opening 28. For replacement, the valve member 20 can most easily be removed by pushing the flange 26 into the sleeve through the opening 15 and letting the water carry it along and out the end of the pipe.

The modification shown in Figs. 5 and 6 may be used where higher operating static pressures are encountered. Examples of such installations are where tall sprinkler risers are used or where the string of pipe is laid along what might be called hill and valley ground, so that water in the pipe sections in the valleys will be under pressure of the head of water to the top of the hill and will remain filled until the head of water drops sufficiently to let each valve member 20 open. This will happen progressively down the string of pipe as the head of water lowers. However, in those cases where a head of water remains, it is preferable to provide a type of valve that will be closed only when a higher static pressure is reached and conversely, which opens itself even if there is some static pressure still in the pipe line.

The valve member 30 generally resembles the valve 20 of Figs. 1-4. It has a cap 31 with an upper convex surface 32 and a lower, generally flat surface 33. The valve member 30 differs from the valve member 20 in that the deflectable portion is thickened, so it has a rim 34 which is preferably substantially cylindrical. The stem 35 and the flange 36 are similar to corresponding parts of the valve member 20.

The thickness of the cap at the rim 34 may be varied to adapt the valve member to closing or opening at any desired water pressure range. In our work we have found a valve member 20 made of soft rubber having a hardness of approximately 40 durometers will close the opening 15 under a static fluid pressure of approximately 1½ pounds per square inch and will open again when the pressure falls to approximately 1 pound per square inch. The valve member 30 made of the same material and being like the valve member 20 except for greater cross-sectional thickness of the cap 31 so that the rim 34 is approximately an eighth of an inch thick will not close until a static pressure of approximately 8 pounds per square inch is reached, and it will open again when the pressure falls to approximately 6 pounds per square inch. The operating pressures to be accommodated may be cared for by increasing or decreasing the cross-sectional thickness of the cap 31. It will be seen that the modification of Figs. 5 and 6 has great adaptability to practically all pressure conditions under which such a valve member might be used.

This type of valve will serve to drain a long string of pipe that follows an up-and-down path with great variation of heights. A section of pipe that is lower than the other pipes may have its whole forty foot section filled with water after the water has been turned off, and the pipes next to it may also be filled. But with this automatic relief valve, the pipes lying at a higher level will drain first, and their draining will reduce the hydrostatic pressure on the valves in lower pipes. These valves will then open, and after the water has been drained from adjacent pipes, the valve in the lowest pipe will automatically drain the remaining water from its pipe.

Figs. 7 and 8 disclose another type of valve 40, which is illustrated to show that the lower surface of the cap need not be flat or planar as has been illustrated in preceding forms of the valve. The cap 41 generally resembles the caps of the other modification described so far, and its upper surface 42 is preferably generally convex. The lower surface 43, however, is somewhat concave. It may be conically concave, or it may be spherically concave so long as its sphere is larger than the sphere of which the upper surface 42 is a segment. The reason for this preference is that to get the most responsive type of action, it is better to have the cap's wall thickness at the rim 44 of the valve cap 41 thinner than the wall thickness at its center. The stem 45 and flange 46 are similar to those of the valves already described. The thickness of the cap at the rim 44 and throughout the head 41 may be varied to increase or to decrease the responsiveness of the valve 40 to any pressure condition.

Figs. 9 and 10 show another modified form of valve member 50. The cap 51 of the valve member 50 in cross-section is shaped about like the cap 41 of the valve member 40 of Fig. 7. Its upper surface is convex. Its lower surface 53 near the rim 54 is flat and this flat radial portion 55 extends in from the rim 54 for about an eighth of an inch on a cap which is about 1¾" in overall diameter. The remaining portion 56 of the under surface 53 is concave, like the lower surface 43 of the valve member 40. If the rim heights 54 and 44 are the same and if the concave portion 56 extends at the same angle as the concave surface 43, the valve member 50 will seal at a higher pressure and will open at a higher pressure than the valve member 40 because there is more rubber in the cap to be deflected to bring the rim into sealing contact with the inside of the pipe sleeve 10.

Generally speaking, for a given size of pipe and a given hardness of rubber, the valve member is varied to obtain a higher or lower sealing pressure (a) by varying the cross-sectional thickness and shape of the cap, (b) by varying the height of the rim 54, and (c) by varying the perimetral diameter of the cap. As to the latter, the greater the diameter of the cap the further the pressure will have to deflect the cap to bring the perimeter into sealing contact with the sleeve wall.

In addition to the lower surfaces described, these valves may have any lower surface shape which stands away from the wall of the pipe around the opening when the valve is at rest and is not under pressure. The lower surface should touch the pipe or sleeve at two opposite areas when there is no fluid pressure in the pipe, and the part of the lower surface next to the stem should be spaced from the pipe wall. The peripheral portions of the cap that lie along the diameter that is parallel to the longitudinal axis of the pipe will not be in contact with the pipe until the cap is deflected by the pressure of the liquid. The thickness of the convex upper surface prevents the valve member from being pushed out through the opening 15 when the pressure increases.

So to summarize this matter, we provide a cap with the lower radial surface (in Fig. 9), or the lower perimetral edge (in Figs. 1, 5, and 7) molded so that it normally maintains itself in a flat plane. The pressure on the cap which will be required to deform each form of cap to bring the radial surface, or the perimetral edge from its flat position into sealing contact with the inside wall of the sleeve adjacent the opening 15, can be governed by the cross-sectional thickness and shape of the cap, by the height of the rim, and by the diameter of the cap.

Fig. 11 shows another type of drain fitting in which these valve members may be used. For simplicity, the valve member 20 is illustrated, but depending on the liquid pressure at which the valve closure is desired, the valve members 30, 40, or 50 could be used.

An end plug 60 is shown, comprising a short length of tubing with a ball coupler 61 on one end and with its other end closed by a wall 62. This fitting is useful to go in the end of a string of pipe. Adjacent the wall 62 a plurality of holes 63 are disposed at spaced intervals around the circumference of the pipe. Six such holes 63 are illustrated, and in each hole there is a valve member 20.

When water fills the string of pipe and the pressure increases, all the valve members 20 will close their respective holes 63. When the water is turned off and the pressure drops, the valve members 20 will open and will allow the water to drain. The upper valves will open first and then the lower ones. The plurality of valves insures that there will always be drainage. No special support is usually needed for the end plug fitting.

When used in the claims, the word "rubber" is intended to refer not only to natural rubber, but also to any properly resilient materials such as synthetics which are suitable for the purposes that have been described.

We claim:

1. A drain for pipe which automatically closes upon the application of a predetermined amount of fluid pressure and automatically opens upon the reduction of fluid pressure below a predetermined amount, including in combination a pipe having an opening through its cylindrical wall; and a valve positioned in and adjacent said opening, said valve including a cap larger than said opening located inside said pipe immediately adjacent said opening and made of resilient material, said cap being thicker at its center than at its rim and having a lower surface that is normally out of contact with the adjacent pipe walls around the opening except at two oppositely spaced points, when not under pressure; and stem means substantially narrower than said opening extending through said opening to retain said valve cap in position in said opening.

2. An automatic pipe drain including in combination a pipe having an opening through its generally cylindrical wall and a mushroom-shaped resilient valve in said opening, said valve having a cap that is wider than said opening, a generally convex upper surface, and a lower surface that diverges in toward the center from said upper surface and also from the walls of said pipe when no pressure is applied to the valve, said valve also including means projecting out through said opening and serving to prevent displacement of said valve from said opening.

3. A drain for pipe which automatically closes upon the application of a predetermined amount of fluid pressure and automatically opens upon the reduction of fluid pressure below a predetermined amount, including in combination a pipe having a drain opening through its generally cylindrical wall; and a valve positioned in and adjacent said opening, said valve comprising a resilient rubber cap larger than said opening lying inside said pipe and supported by the pipe walls, having a convexly curved upper surface and a lower surface that, before the application of liquid pressure, diverges from the curve of the pipe wall around said opening so that it normally does not seal the opening, and a stem extending down from said lower surface through said opening a distance substantially greater than the thickness of said pipe wall and terminating in a rubber flange that is larger in diameter than said opening.

4. The drain of claim 3 in which there is a metal washer larger than said pipe opening, said washer having an opening smaller than said pipe opening, said washer being positioned around said stem between said flange and the wall of said pipe.

5. The drain of claim 3 in which the lower surface of the cap is generally planar.

6. The drain of claim 3 in which the lower surface of the cap is tapered upwardly from the periphery in so that it is generally concave.

7. The drain of claim 3 in which said cap is shaped with a vertical thickness at its rim, spacing apart its bottom and top surfaces, the thickness being such that said valve will close at a predetermined pressure.

8. An automatic pipe drain including in combination a pipe having a drain opening through its generally cylindrical wall and a mushroom-shaped resilient valve in said opening, said valve having a cap that is wider than said opening, said cap having a generally convex upper surface and a lower surface that normally diverges in toward the center from the wall of said pipe, a stem substantially smaller in diameter than said opening extending from said cap out through said opening, and a flanged base at the outer end of said stem a substantial distance beyond said pipe wall larger in diameter than said opening.

9. The drain of claim 8 in which a metal washer surrounds said stem outside said pipe, said washer having an outside diameter greater than said opening and an inside diameter smaller than said opening.

10. An irrigation pipe adapted to automatically drain upon the releasing of liquid pressure, said pipe having an opening through its cylindrical side wall intermediate its ends and adapted to be positioned along the bottom thereof when said pipe is in position for irrigation, and a mushroom-shaped rubber valve member positioned in said opening, said valve member including a resilient cap considerably larger than said opening with a convex upper surface and a lower surface normally of a shape that diverges from the curve of its adjacent pipe wall, and a stem smaller than said opening so as to permit clearance, extending down through said opening and terminating in a resilient flange a substantial distance below said opening, said flange being larger in diameter than said opening but able to be forced in and out of said opening.

11. An irrigation pipe adapted to automatically drain upon the relasing of liquid pressure, including two sections of pipe, a short cylindrical sleeve press-fitted between them and having two openings through its side wall diametrically opposite each other, one of which is normally adapted to lie along the bottom of the sleeve; and the other along the top, and a rubber mushroom-shaped valve member positioned in said lower opening and including a resilient cap considerably larger than said opening and having a convex upper surface and a lower surface that normally diverges from the adjacent wall of said sleeve, and a stem smaller than said opening so as to permit clearance, extending down through said opening and terminating a substantial distance below said opening in a resilient flange that is larger in diameter than said opening but may be forced in and out of said opening.

12. An end plug pipe fitting adapted to automatically seal on the application of pressure and to automatically drain upon the releasing of liquid pressure, said fitting having a closed end, a plurality of openings through its cylindrical side wall adjacent its closed end and a mushroom-shaped rubber valve member positioned in each said opening, said valve member including a resilient cap considerably larger than said opening with a convex upper surface and a lower surface normally of a shape that diverges from the curve of its adjacent pipe wall, and a stem smaller than said opening so as to permit clearance, extending out through said opening and terminating a substantial distance therebeyond in a resilient flange that is larger in diameter than said opening but may be forced in and out of said opening.

EDWARD E. WITTNER.
ROGER M. SHERMAN.

References Cited in the file of this patent

UNITED STATES PATENTS

| Number | Name | Date |
|---|---|---|
| 569,943 | Shirley | Oct. 20, 1896 |
| 1,365,644 | Applin | Jan. 18, 1921 |
| 1,950,325 | Punte | Mar. 6, 1934 |
| 2,068,481 | Brown | Jan. 19, 1937 |
| 2,163,477 | Warr | June 20, 1939 |
| 2,177,224 | Ohlrogge | Oct. 24, 1939 |
| 2,214,346 | Pim | Sept. 10, 1940 |
| 2,512,695 | Stout et al. | June 27, 1950 |
| 2,571,893 | Kendall | Oct. 16, 1951 |